(12) United States Patent
Goddard et al.

(10) Patent No.: US 8,733,405 B2
(45) Date of Patent: May 27, 2014

(54) CORRUGATED PIPE WITH OUTER LAYER

(75) Inventors: James B. Goddard, Powell, OH (US);
John M. Kurdziel, Fort Wayne, IN (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 1253 days.

(21) Appl. No.: 12/019,738

(22) Filed: Jan. 25, 2008

(65) Prior Publication Data

US 2008/0210327 A1      Sep. 4, 2008

Related U.S. Application Data

(63) Continuation-in-part of application No. 11/078,323, filed on Mar. 14, 2005, now Pat. No. 7,484,535.

(51) Int. Cl.
*F16L 11/00* (2006.01)

(52) U.S. Cl.
USPC .......................................... 138/121; 138/122

(58) Field of Classification Search
USPC ................................................. 138/121, 122
See application file for complete search history.

(56) References Cited

U.S. PATENT DOCUMENTS

| | | |
|---|---|---|
| 2,700,631 A | 1/1955 | Sussenbach et al. |
| 2,753,596 A | 7/1956 | Bailey |
| 2,877,150 A | 3/1959 | Wilson |
| 2,888,954 A | 6/1959 | Gates |
| 2,931,069 A | 4/1960 | McCormick |
| 3,081,102 A | 3/1963 | Murray et al. |
| 3,379,805 A | 4/1968 | Roberts |
| 3,490,496 A | 1/1970 | Steams |
| 3,538,209 A | 11/1970 | Hegler |
| 3,573,871 A | 4/1971 | Warner |
| 3,605,232 A | 9/1971 | Hines |
| 3,649,730 A | 3/1972 | Lachenmayer et al. |
| 3,677,676 A | 7/1972 | Hegler |
| 3,725,565 A | 4/1973 | Schmidt |
| 3,802,908 A | 4/1974 | Emmons |
| 3,819,292 A | 6/1974 | Wentworth |

(Continued)

FOREIGN PATENT DOCUMENTS

| | | |
|---|---|---|
| DE | 1 278 734 | 9/1968 |
| DE | 2 042 031 | 8/1970 |

(Continued)

OTHER PUBLICATIONS

Non-final Office Action dated Jul. 3, 2007, in U.S. Appl. No. 11/078,323.

(Continued)

*Primary Examiner* — James Hook
(74) *Attorney, Agent, or Firm* — Finnegan, Henderson, Farabow, Garrett & Dunner, L.L.P.

(57) ABSTRACT

A pipe having an axially extending bore defined by a smooth inner wall fused to a corrugated outer wall is provided. The corrugated outer wall has axially adjacent, annular, outwardly-extending crests separated by valleys. The pipe further includes an outer layer fused to the outer wall, the outer layer having adjacent concave portions and convex portions, the concave portions being aligned with corrugation valleys of the outer wall so that each concave portion of the outer layer extends between at least two corrugation crests. A method of improving the resistance to deformation of a corrugated pipe having a smooth inner wall fused to an outer wall defined by annular crests and valleys is also provided.

10 Claims, 8 Drawing Sheets

(56) References Cited

U.S. PATENT DOCUMENTS

| | | | | |
|---|---|---|---|---|
| 3,824,886 A | | 7/1974 | Hegler | |
| 3,837,364 A | | 9/1974 | Jenner | |
| 3,869,235 A | | 3/1975 | Moore | |
| 3,944,641 A | | 3/1976 | Lemelson | |
| 3,957,386 A | | 5/1976 | Lupke | |
| 4,042,661 A | | 8/1977 | Cook | |
| 4,113,411 A | | 9/1978 | Terragni | |
| 4,165,214 A | | 8/1979 | Lupke et al. | |
| 4,180,357 A | | 12/1979 | Lupke | |
| 4,218,164 A | | 8/1980 | Lupke | |
| 4,219,293 A | | 8/1980 | Licht | |
| 4,220,181 A | | 9/1980 | Nyssen | |
| 4,223,895 A | | 9/1980 | Roberts, Jr. et al. | |
| 4,230,157 A | | 10/1980 | Larsen et al. | |
| 4,262,162 A | | 4/1981 | Plinke et al. | |
| 4,281,981 A | | 8/1981 | Feldman | |
| 4,303,104 A | * | 12/1981 | Hegler et al. | 138/121 |
| 4,319,476 A | | 3/1982 | Fuchs, Jr. | |
| 4,352,701 A | | 10/1982 | Shimba et al. | |
| 4,377,545 A | | 3/1983 | Hornbeck | |
| 4,397,797 A | | 8/1983 | Nojiri et al. | |
| 4,402,658 A | | 9/1983 | Larsen | |
| 4,415,389 A | | 11/1983 | Medford et al. | |
| 4,436,679 A | | 3/1984 | Winstead | |
| 4,439,130 A | | 3/1984 | Dickhut et al. | |
| 4,492,551 A | | 1/1985 | Hegler et al. | |
| 4,523,613 A | | 6/1985 | Fouss et al. | |
| 4,528,832 A | | 7/1985 | Fuchs, Jr. | |
| 4,534,923 A | | 8/1985 | Lupke | |
| 4,547,246 A | | 10/1985 | Viriyayuthakorn et al. | |
| 4,562,990 A | | 1/1986 | Rose | |
| 4,572,523 A | | 2/1986 | Guettouche et al. | |
| 4,588,546 A | | 5/1986 | Feil et al. | |
| 4,666,649 A | | 5/1987 | Takubo et al. | |
| 4,678,526 A | | 7/1987 | Hawerkamp | |
| 4,683,166 A | | 7/1987 | Yuto et al. | |
| 4,703,639 A | | 11/1987 | Fuchs, Jr. | |
| 4,756,339 A | | 7/1988 | Buluschek | |
| 4,779,651 A | | 10/1988 | Hegler et al. | |
| 4,789,327 A | | 12/1988 | Chan et al. | |
| 4,808,098 A | | 2/1989 | Chan et al. | |
| 4,846,660 A | | 7/1989 | Drossbach | |
| 4,849,113 A | | 7/1989 | Hills | |
| 4,852,616 A | * | 8/1989 | Holcomb | 138/173 |
| 4,854,416 A | | 8/1989 | Lalikos et al. | |
| 4,862,728 A | | 9/1989 | Hardouin | |
| 4,862,924 A | | 9/1989 | Kanao | |
| 4,900,503 A | | 2/1990 | Hegler et al. | |
| 4,906,496 A | | 3/1990 | Hosono et al. | |
| 4,970,351 A | | 11/1990 | Kirlin | |
| 5,045,254 A | | 9/1991 | Peelman et al. | |
| 5,058,934 A | | 10/1991 | Brannon | |
| 5,071,173 A | * | 12/1991 | Hegler et al. | 285/399 |
| 5,089,074 A | | 2/1992 | Winter et al. | |
| 5,124,109 A | | 6/1992 | Drossbach | |
| 5,129,428 A | | 7/1992 | Winter et al. | |
| 5,129,429 A | | 7/1992 | Winter et al. | |
| 5,129,685 A | | 7/1992 | Engel | |
| 5,145,545 A | | 9/1992 | Winter et al. | |
| 5,156,901 A | | 10/1992 | Tanaka | |
| 5,192,834 A | | 3/1993 | Yamanishi et al. | |
| 5,222,288 A | | 6/1993 | Thomas | |
| 5,228,479 A | | 7/1993 | Thomas | |
| 5,256,233 A | | 10/1993 | Winter et al. | |
| 5,262,109 A | | 11/1993 | Cook | |
| 5,275,544 A | | 1/1994 | Marlowe | |
| 5,279,332 A | | 1/1994 | Winter et al. | |
| 5,314,553 A | | 5/1994 | Hashimoto et al. | |
| 5,330,600 A | | 7/1994 | Lupke | |
| 5,335,945 A | * | 8/1994 | Meyers | 285/236 |
| 5,346,384 A | | 9/1994 | Hegler et al. | |
| 5,372,774 A | | 12/1994 | Lupke | |
| 5,383,497 A | | 1/1995 | Winter et al. | |
| 5,383,998 A | | 1/1995 | Lupke | |
| 5,391,334 A | | 2/1995 | Enomoto | |
| 5,394,904 A | | 3/1995 | Winter et al. | |
| 5,441,083 A | | 8/1995 | Korsgaard | |
| 5,456,291 A | * | 10/1995 | Kunzmann | 138/121 |
| 5,460,771 A | | 10/1995 | Mitchell et al. | |
| 5,462,090 A | | 10/1995 | Winter et al. | |
| 5,466,402 A | | 11/1995 | Lupke | |
| 5,469,892 A | | 11/1995 | Noone et al. | |
| 5,472,659 A | | 12/1995 | Hegler et al. | |
| 5,472,746 A | | 12/1995 | Miyajima et al. | |
| 5,522,718 A | | 6/1996 | Dietrich | |
| 5,531,952 A | | 7/1996 | Hatfield | |
| 5,545,369 A | | 8/1996 | Lupke | |
| 5,572,917 A | | 11/1996 | Truemner et al. | |
| 5,608,637 A | | 3/1997 | Wang et al. | |
| 5,620,722 A | | 4/1997 | Spina | |
| 5,640,951 A | * | 6/1997 | Huddart et al. | 128/204.17 |
| 5,649,713 A | | 7/1997 | Ledgerwood | |
| 5,706,864 A | | 1/1998 | Pfleger | |
| 5,715,870 A | | 2/1998 | Winter et al. | |
| 5,759,461 A | | 6/1998 | Jarvenkyla et al. | |
| 5,773,044 A | | 6/1998 | Dietrich et al. | |
| 5,778,940 A | * | 7/1998 | Tucker et al. | 138/127 |
| 5,848,618 A | | 12/1998 | Guest | |
| 5,894,865 A | | 4/1999 | Winter et al. | |
| 5,901,754 A | | 5/1999 | Elsässer et al. | |
| 5,904,643 A | | 5/1999 | Seeberger et al. | |
| 5,909,908 A | | 6/1999 | Furuse | |
| 5,912,023 A | | 6/1999 | Katoh et al. | |
| 5,975,143 A | | 11/1999 | Järvenkylä et al. | |
| 5,976,298 A | | 11/1999 | Hegler et al. | |
| 6,000,434 A | | 12/1999 | Winter et al. | |
| 6,016,848 A | | 1/2000 | Egres, Jr. | |
| 6,039,082 A | | 3/2000 | Winter et al. | |
| 6,062,268 A | | 5/2000 | Elsasser et al. | |
| 6,082,741 A | | 7/2000 | Gregoire et al. | |
| 6,161,591 A | | 12/2000 | Winter et al. | |
| 6,186,182 B1 | | 2/2001 | Yoon | |
| 6,199,592 B1 | | 3/2001 | Siferd et al. | |
| 6,240,969 B1 | | 6/2001 | Wildermuth | |
| 6,335,101 B1 | | 1/2002 | Haeger et al. | |
| 6,399,002 B1 | | 6/2002 | Lupke et al. | |
| 6,405,974 B1 | | 6/2002 | Herrington | |
| 6,461,078 B1 | | 10/2002 | Presby | |
| 6,491,994 B1 | | 12/2002 | Kito et al. | |
| 6,524,519 B1 | | 2/2003 | Ohba et al. | |
| 6,555,243 B2 | | 4/2003 | Flepp et al. | |
| 6,591,871 B2 | | 7/2003 | Smith et al. | |
| 6,607,010 B1 | | 8/2003 | Kashy | |
| 6,631,741 B2 | | 10/2003 | Katayama et al. | |
| 6,645,410 B2 | | 11/2003 | Thompson | |
| 6,682,677 B2 | | 1/2004 | Lobovsky et al. | |
| 6,696,011 B2 | | 2/2004 | Yun et al. | |
| 6,719,302 B2 | | 4/2004 | Andrick | |
| 6,787,092 B2 | | 9/2004 | Chan et al. | |
| 6,848,464 B2 | | 2/2005 | Ransom | |
| 6,848,478 B2 | | 2/2005 | Nagai | |
| 6,854,168 B2 | | 2/2005 | Booms et al. | |
| 6,933,028 B2 | | 8/2005 | Milhas | |
| 6,935,378 B2 | | 8/2005 | Ikemoto et al. | |
| 6,955,780 B2 | | 10/2005 | Herrington | |
| 6,983,769 B2 | * | 1/2006 | Arima et al. | 138/121 |
| 7,074,027 B2 | | 7/2006 | Starita | |
| 7,114,944 B2 | | 10/2006 | Wolfe et al. | |
| 7,118,369 B2 | | 10/2006 | Dietrich et al. | |
| 7,122,074 B2 | | 10/2006 | Kim | |
| 7,140,859 B2 | | 11/2006 | Herrington | |
| 7,156,128 B1 | | 1/2007 | Kanao | |
| 7,185,894 B2 | | 3/2007 | Kish et al. | |
| 7,347,225 B2 | | 3/2008 | Nobileau | |
| 2002/0179232 A1 | | 12/2002 | Thompson | |
| 2004/0146696 A1 | | 7/2004 | Jones | |
| 2004/0187946 A1 | | 9/2004 | Herrington | |
| 2004/0241368 A1 | | 12/2004 | Iwata et al. | |
| 2006/0293159 A1 | | 12/2006 | Neubauer | |
| 2007/0204929 A1 | | 9/2007 | Jarvenkyla | |
| 2008/0118596 A1 | | 5/2008 | Hetzner et al. | |
| 2009/0127852 A1 | * | 5/2009 | Sutton et al. | 285/374 |

(56) References Cited

U.S. PATENT DOCUMENTS

FOREIGN PATENT DOCUMENTS

| | | |
|---|---|---|
| DE | 1 704 718 | 7/1971 |
| DE | 2 042 031 | 5/1972 |
| DE | 2 413 878 | 2/1976 |
| DE | 2 403 618 | 12/1980 |
| DE | 2 804 540 C2 | 1/1984 |
| DE | 297 06 045 | 6/1997 |
| EP | 0 041 252 | 12/1981 |
| EP | 0 096 957 B1 | 5/1989 |
| EP | 0 385 465 A2 | 3/1990 |
| EP | 0 385 465 B1 | 3/1990 |
| EP | 0 494 566 A1 | 7/1992 |
| EP | 0 581 064 A1 | 7/1993 |
| EP | 0 726 134 B1 | 2/1996 |
| EP | 0 543 243 B1 | 2/1997 |
| EP | 0 600 214 B1 | 3/1998 |
| EP | 0 890 770 A2 | 5/1998 |
| EP | 0 890 770 B1 | 5/1998 |
| EP | 1 293 718 A2 | 3/2003 |
| EP | 0 600 214 B2 | 4/2006 |
| FR | 1 486 473 | 6/1967 |
| GB | 1148277 | 4/1967 |
| GB | 1 148 277 | 4/1969 |
| GB | 2 300 684 | 11/1996 |
| JP | 56144943 | 11/1981 |
| JP | 57160518 | 10/1982 |
| JP | 57-193479 U | 12/1982 |
| JP | 58168422 | 10/1983 |
| JP | 59 026224 | 2/1984 |
| JP | 59114027 | 6/1984 |
| JP | 61135416 | 6/1986 |
| JP | H02-85087 U | 7/1990 |
| JP | 06 64062 | 3/1994 |
| JP | 08-258175 | 10/1996 |
| JP | 08-258176 | 10/1996 |
| JP | 08 267128 | 10/1996 |
| JP | 2003062891 | 3/2003 |
| WO | WO 85/00140 | 1/1985 |
| WO | WO 98/12046 | 3/1998 |
| WO | WO 2004/094888 A1 | 11/2004 |

OTHER PUBLICATIONS

Final Office Action dated Dec. 27, 2007, in U.S. Appl. No. 11/078,323.
Non-final Office Action dated May 29, 2008, in U.S. Appl. No. 11/078,323.
*Modern Plastics Worldwide*, Apr. 2008 edition, p. 35, "Device offers alternative for constant flow filtration.".
Foerst, Dr. Wilhelm, Ullmanns Encyklopädie der technischen Chemia, Urban & Schwarzenberg, Munchen, Berline, Germany, pp. 52-53, 71-73, 1960.
U.S. Appl. No. 11/078,323, filed Mar. 14, 2005, Entitled Corrugated Pipe with Outer Layer.
Extended EP Search Report for European Patent Application No. 06737855.4-1252 dated Nov. 17, 2011.

* cited by examiner

CORRUGATED PIPE WITH OUTER LAYER

RELATED APPLICATION

This application is a continuation-in-part of U.S. patent application Ser. No. 11/078,323, which was filed on Mar. 14, 2005, now U.S. Pat. No. 7,484,535 and which is incorporated herein by reference.

FIELD OF THE INVENTION

The present invention relates generally to corrugated pipe having an additional outer layer, and more particularly, to such a corrugated pipe for use in the drainage of soil and transportation of surface water by gravity.

BACKGROUND OF THE INVENTION

Corrugated pipe has been used in the drainage of water-saturated soil in various agricultural, residential, recreational, or civil engineering and construction applications, such as for storm sewers. Traditionally, drainage pipe was made from clay or concrete, which caused the pipe to be heavy, expensive, and brittle. In order to improve the cost-effectiveness, durability, and ease-of-installation of drainage pipes, it is now common in the art to manufacture them from various materials including various polymers and polymer blends. Such polymer pipes are typically corrugated, having a molded profile with sides of the corrugation that are fairly steep and a top, or crest, of the corrugation that is fairly flat.

There are two basic ways that polymer, corrugated pipe can fail in use: by deforming excessively or by fracturing. Stiffer material is less likely to deform but more likely to fracture under stress. Flexible material is more likely to deform but less likely to fracture under stress. Deformation is expressed as a ratio of elongation of the material to its original material length and is called "strain." Stress causes the deformation that produces strain. The modulus, or stiffness, of a plastic is the ratio of stress divided by strain, or the amount of stress required to produce a given strain.

There are a number of ways to provide lower deformation of a pipe in use: (1) increasing pipe stiffness by using a stiffer material; (2) thickening the pipe walls; or (3) changing the wall design to increase the moment of inertia, which increases the overall stiffness of the pipe wall. Using stiffer material to make a corrugated plastic pipe is disadvantageous because the pipe must be able to deflect under load to a certain degree without cracking or buckling. A certain amount of elasticity is therefore beneficial in preventing brittle failures upon deflection.

Thickening the pipe walls is also disadvantageous because it adds material cost and increases weight to the pipe, which increases shipping and handling costs. Thus, it is advantageous to find a wall design that increases the moment of inertia of the pipe, while causing a minimal increase to the weight of the pipe or the stiffness of the material used to make the pipe.

Increasing the moment of inertia of a pipe wall increases its resistance to bending. One example of a wall design that increases the moment of inertia, and therefore the stiffness, of a plastic corrugated pipe with minimal increase in pipe weight and material stiffness is illustrated in U.S. Pat. No. 6,644,357 to Goddard. In this pipe, the ratio of the height of a corrugation to the width of that corrugation is less than 0.8:1.0, and the sidewall of the corrugation is inclined, with respect to the pipe's inner wall, in the range of 75-80°. This ratio allows the pipe to deflect to greater than 30% of its original diameter without exhibiting imperfections associated with structural failure.

Pipe failure can be prevented by minimizing the maximum force exerted on the pipe walls during the bending associated with deformation. If a sheet of material, such as plastic, is flexed, the outside of the resulting curve is deformed in tension, and the inside of the curve is deformed in compression. Somewhere near the middle of a solid sheet is a neutral plane called the centroid of the sheet. In the case of corrugated pipe, the "sheet" thickness comprises corrugations to achieve economy of material. Because the "sheet" is therefore not solid, the centroid may not be in the middle of the sheet, but rather is located at the center of the radius of gyration of the mass (i.e., the centroid is displaced toward the location of greater mass). The more offset the centroid is from the middle of the sheet thickness, the greater the maximum force will be at the surface farthest from the centroid during bending or flexure from deformation, due to a longer moment arm for certain acting forces. Thus, to lower the maximum force caused by pipe wall deformation, the pipe should be designed so that the centroid is closer to the middle of the sheet thickness. The closer the centroid is to the middle of the sheet thickness, the more desirably uniform the stress distribution will be. Thus, the maximum stress upon deformation will be minimized to prevent pipe failure due to shorter moment arms for acting forces.

FIG. 1 illustrates a vertical cross-section of a sidewall section of one type of prior art double-wall corrugated pipe. The illustrated section includes a smooth inner wall 100 and a corrugated outer wall 110. The corrugated outer wall includes corrugation crests 120 and corrugation valleys 130.

In use, it is the deflection and integrity of inner wall 100 that is critical to pipe performance. Deflection of the outer wall 110 is greater than deflection of the inner wall 100 in use, but a certain amount of deflection of the corrugated outer wall 110 is acceptable because, although maintaining the integrity of the outer wall 110 is advantageous, its integrity can be sacrificed to a certain extent without affecting pipe performance, as long as the integrity of the inner wall 100 is maintained. Thus, it is advantageous to provide some flexibility in the outer wall 110 so that it can deflect in use without that deflection translating to the inner wall 100. Although the double wall pipe illustrated in FIG. 1 may have sufficient flexibility, its centroid is too far from the middle of its sheet thickness to provide sufficiently uniform stress distribution during deformation. Moreover, the double wall pipe profile provides insufficient resistance to pipe buckling, for a given amount of raw material. Therefore, the double wall pipe may not be stiff enough to provide installation insensitivity and long-term durability.

Accordingly, it would be advantageous to provide a corrugated polymer pipe having an additional outer layer that increases the moment of inertia so the pipe experiences less deformation in use, and greater resistance to buckling.

SUMMARY OF THE INVENTION

The objects and advantages of the invention may be realized and attained by means of features and combinations particularly pointed out in the appended claims.

One exemplary embodiment of the present disclosure provides a pipe having an axially extending bore defined by a smooth inner wall fused to a corrugated outer wall. The corrugated outer wall has axially adjacent, annular, outwardly-extending crests separated by valleys. The pipe further includes an outer layer fused to the outer wall, the outer layer having adjacent concave portions and convex portions, the concave portions being aligned with corrugation valleys of the outer wall so that each concave portion of the outer layer extends between at least two corrugation crests.

Another exemplary embodiment of the present disclosure provides a method of improving the resistance to deformation of a corrugated pipe having a smooth inner wall fused to an outer wall defined by annular crests and valleys. The method includes: fixing an outer layer having adjacent annular concave portions and convex portions to the outer wall with the concave portions being aligned with corrugation valleys of the outer wall so that each concave portion of the outer layer extends between at least two corrugation crests.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for designing other structures, methods, and systems for carrying out the several purposes of the present invention. It is important, therefore, to recognize that the claims should be regarded as including such equivalent constructions insofar as they do not depart from the spirit and scope of the present invention.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENTS

Reference will now be made in detail to the exemplary embodiments of the invention, examples of which are illustrated in the accompanying drawings.

Figure 1:
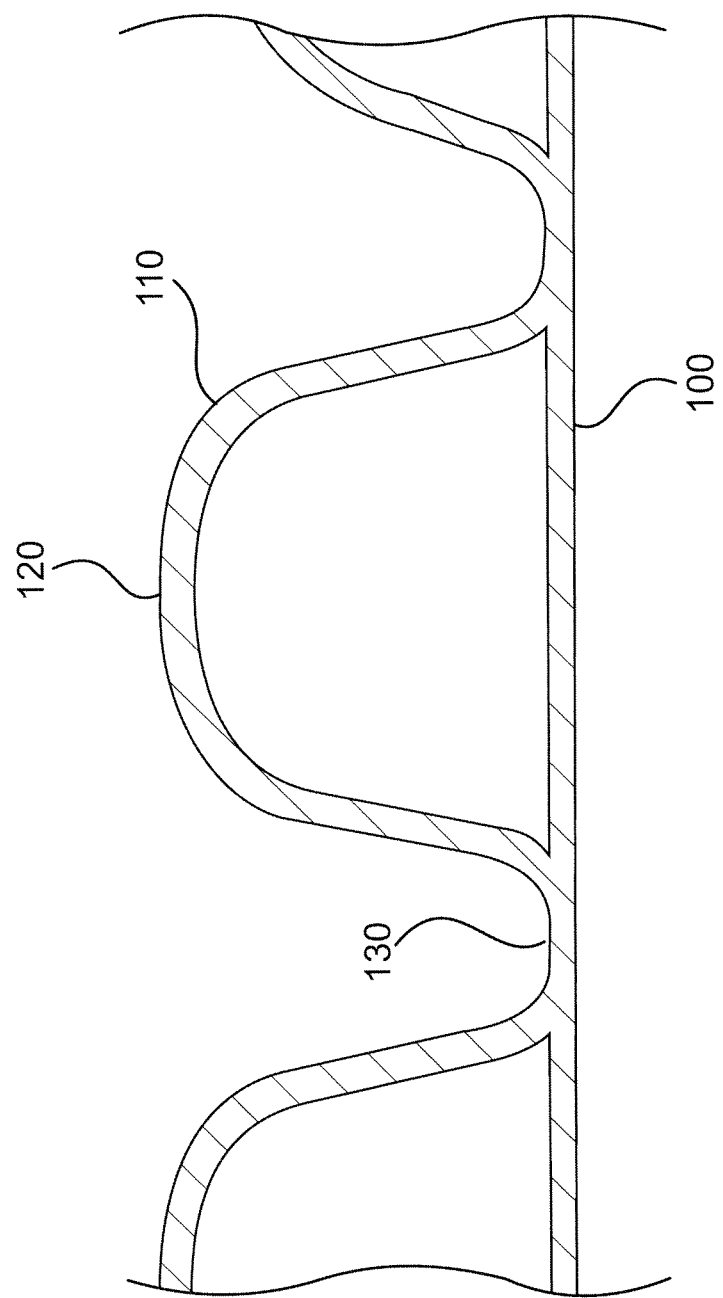
FIG. 1 illustrates a cross-section of a sidewall of one type of prior art double-wall corrugated pipe.
Figure 2:
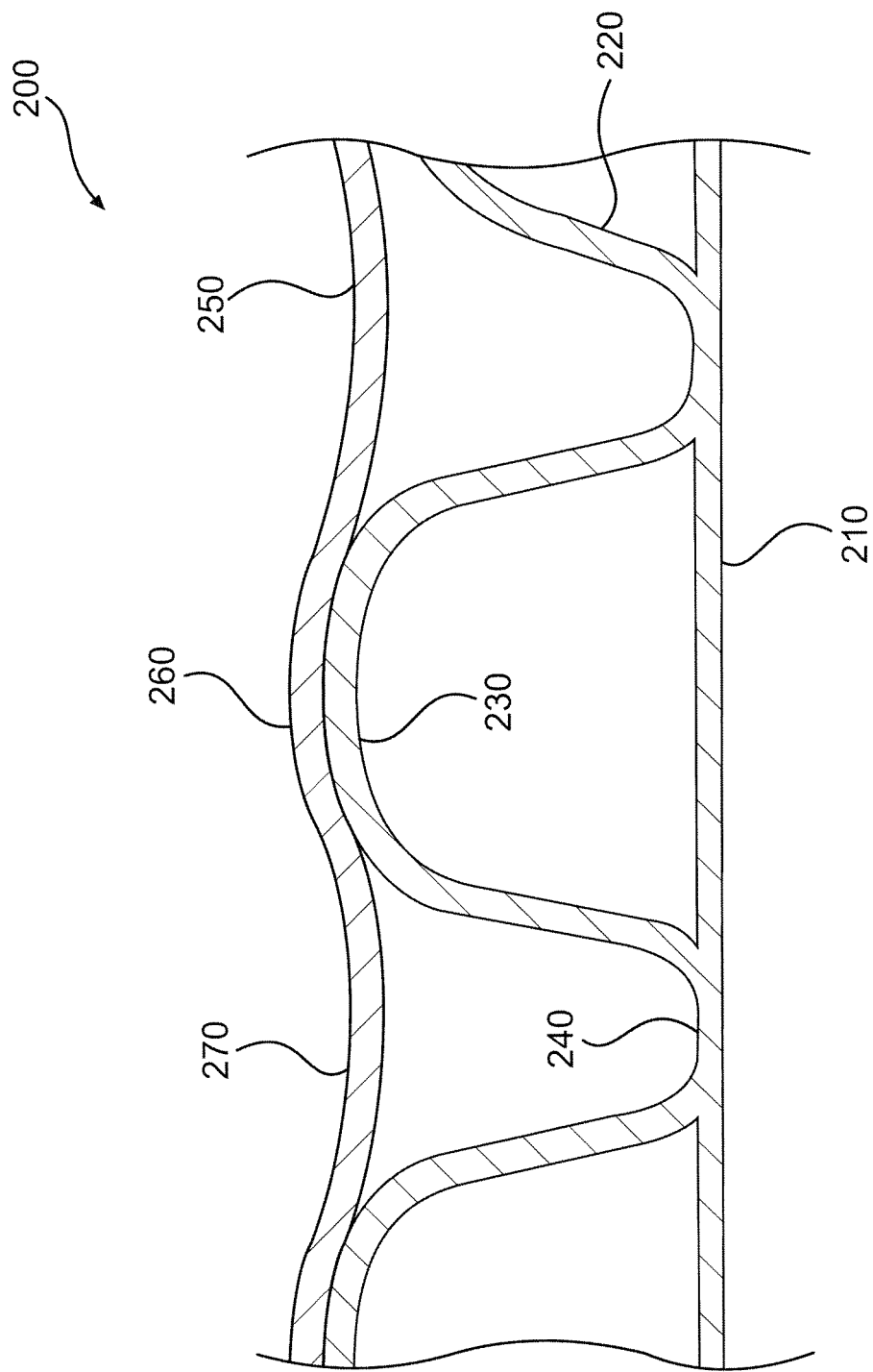
FIG. 2 illustrates a cross-section of a sidewall of an exemplary embodiment of a three-wall, corrugated pipe consistent with the present invention.

FIG. 2 illustrates a cross-section of a sidewall of an exemplary embodiment of a three-wall, corrugated pipe consistent with the present invention. The illustrated section of pipe wall 200 preferably includes a smooth inner wall 210 and a corrugated outer wall 220. The inner wall 210 has a smooth interior surface to improve the hydraulics of fluid traveling through the pipe. The corrugated outer wall 220 provides a high strength-to-weight ratio for the pipe wall 200.

The corrugated outer wall 220 includes corrugation crests 230 and corrugation valleys 240. On top of the corrugated outer wall 220 is an outer layer 250 of the pipe wall 200 that includes convex portions 260 and concave portions 270. The concave portions 270 of the outer layer 250 are generally aligned with the valleys 240 and extend between adjacent crests 230 of the outer wall 220.

For the purposes of example and illustration, the present disclosure will be discussed with respect to two exemplary dimensional scenarios of the illustrated embodiment. For an exemplary embodiment of eighteen inch diameter corrugated pipe, an inner wall 210 may have a thickness of approximately 0.052 inches and an outer wall 220 may have a material thickness of approximately 0.08 inches to approximately 0.09 inches. In some cases, the thickness of the walls may not be completely uniform. The thickness of the outer layer 250 may be approximately 0.052 inches. The axial distance between the midpoint of adjacent corrugation valleys 240 may be approximately 2.617 inches. The radial distance between the top of the thickness that forms the corrugation valley 240 and the top of the thickness that forms the corrugation crest 230 may be approximately 1.3566 inches. The radial distance between the peak of a convex portion 260 of the outer layer 250 and the valley of a concave portion 270 of the outer layer 250 ("outer layer corrugation height" or "wave height") may be approximately 0.25 inches. In some cases, the thickness of the outer layer 250 may not be completely uniform.

For an exemplary embodiment of forty-two inch diameter corrugated pipe, an inner wall 210 may have a thickness of approximately 0.111 inches and an outer wall 220 may have a material thickness of approximately 0.15 inches to approximately 0.16 Inches. In some cases, the thickness of the walls may not be completely uniform. The thickness of the outer layer 250 may be approximately 0.1123 inches. The axial distance between the midpoint of adjacent corrugation valleys 240 may be approximately 5.1383 inches. The radial distance between the top of the thickness that forms the corrugation valley 240 and the top of the thickness that forms the corrugation crest 230 may be approximately 2.9025 inches. The radial distance between the peak of a convex portion 260 of the outer layer 250 and the valley of a concave portion 270 of the outer layer 250 ("Outer Layer Corrugation Height") may be approximately 0.25 inches. In some cases, the thickness of the outer layer 250 may not be completely uniform.

The following chart provides some exemplary dimensions of a greater variety of pipe sizes:

| Pipe Diameter (inside bore) | Pipe Diameter (exterior) | Inner Wall (210) Thickness | Outer Layer (250) Thickness | Outer Layer (250) Corrugation Height |
|---|---|---|---|---|
| 12" | 14.59" | 0.035" | 0.040" | 0.100" |
| 15" | 17.76" | 0.039" | 0.045" | 0.133" |
| 18" | 21.38" | 0.051" | 0.050" | 0.133" |
| 24" | 28.03" | 0.059" | 0.075" | 0.160" |
| 30" | 35.40" | 0.059" | 0.080" | 0.213" |
| 36" | 42.05" | 0.067" | 0.090" | 0.267" |
| 42" | 48.06" | 0.709" | 0.095" | 0.267" |
| 48" | 53.98" | 0.709" | 0.110" | 0.267" |
| 60" | 67.43" | 0.078" | 0.130" | 0.305" |

It is to be understood that these pipe dimensions are merely exemplary, and that the present invention contemplates various pipes having a wide variety of dimensions. However, detailed experimental examples will be discussed below with respect to an exemplary embodiment of forty-eight inch corrugated pipe having an outer layer.

Specifically, two studies were performed on ADS standard N-12 design 48-inch, three-wall corrugated pipe. The studies examined the influence of the thickness of the outer layer 250, the outer layer corrugation height, and the thickness of the outer wall 220, on overall pipe stiffness and buckling.

The first study examined the effect of changing the thickness of the outer layer 250 (i.e., 0.12", 0.16", 0.20", 0.24", and 0.28") for four different outer layer corrugation heights (i.e., 0", 0.125", 0.25", and 0.375"), given a fixed thickness for each of the inner wall 210 and the outer wall 220. The twenty different cases are represented in the table below:

| Case Number | Outer Layer 250 Corrugation Height (inches) | Outer Layer 250 Thickness (inches) |
|---|---|---|
| 1 | 0 | 0.12 |
| 2 | 0 | 0.16 |
| 3 | 0 | 0.20 |
| 4 | 0 | 0.24 |
| 5 | 0 | 0.28 |
| 6 | 0.125 | 0.12 |
| 7 | 0.125 | 0.16 |
| 8 | 0.125 | 0.20 |
| 9 | 0.125 | 0.24 |
| 10 | 0.125 | 0.28 |
| 11 | 0.25 | 0.12 |
| 12 | 0.25 | 0.16 |
| 13 | 0.25 | 0.20 |
| 14 | 0.25 | 0.24 |
| 15 | 0.25 | 0.28 |
| 16 | 0.375 | 0.12 |
| 17 | 0.375 | 0.16 |
| 18 | 0.375 | 0.20 |
| 19 | 0.375 | 0.24 |
| 20 | 0.375 | 0.28 |

Figure 3:
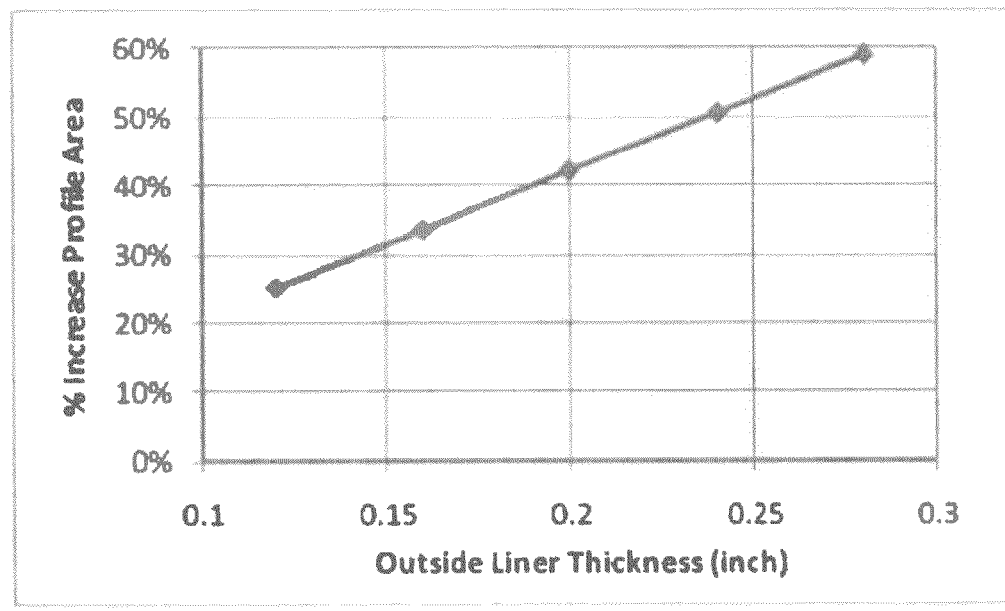
FIG. 3 illustrates a chart comparing an outside linear thickness of an outer layer of a pipe to a percent increase in pipe profile area.

The addition of the various thicknesses of outer layer 250 resulted in a percent increase in pipe profile area, compared to a standard N-12 profile, as shown in FIG. 3.

Figure 4:
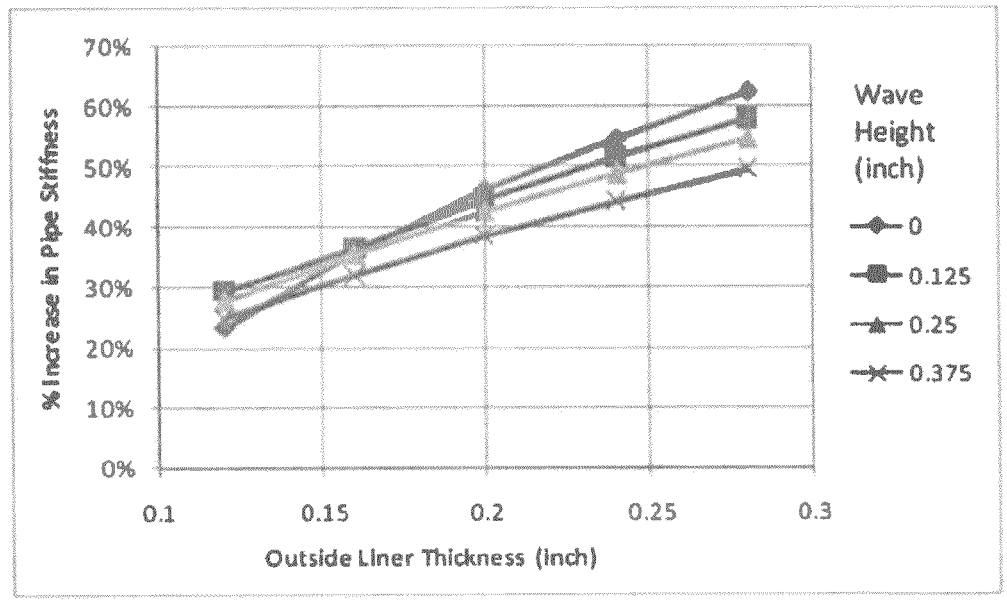
FIG. 4 illustrates a chart comparing an outside linear thickness of an outer layer of a pipe to a percent increase in pipe stiffness.

Finite element analyses were conducted for the twenty cases to determine the percent increase in pipe stiffness for each thickness of added outer layer 250, compared to a standard N-12, 48-inch pipe, as shown in FIG. 4.

The results confirmed that, for most thicknesses of the added outer layer 250, an increase in wave height may reduce the benefit of the added pipe stiffness.

Figure 5:
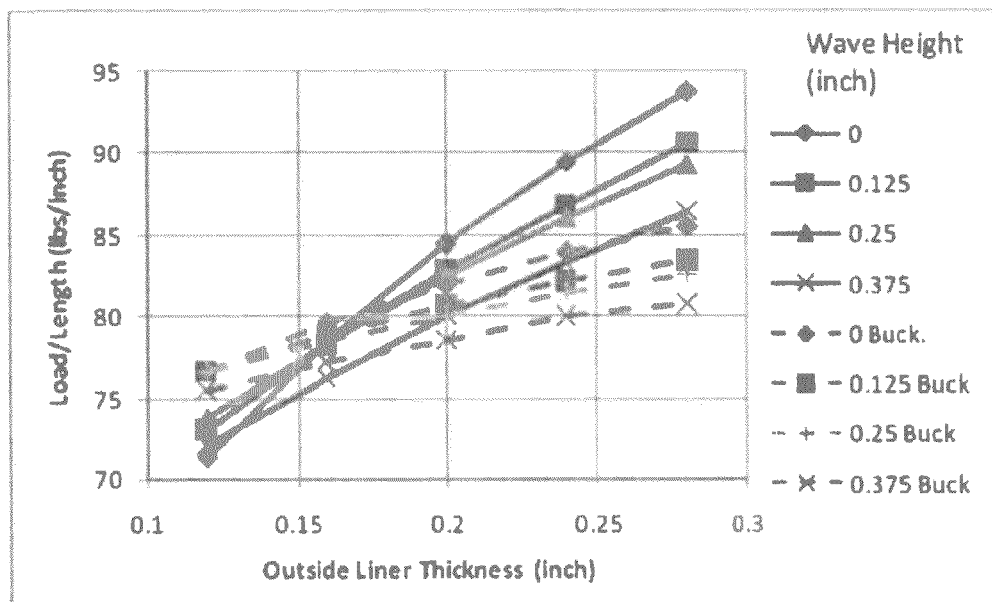
FIG. 5 illustrates a chart comparing an outside linear thickness of an outer layer of a pipe to a load per length.

Linear buckling analyses were also conducted on the profiles to determine the load per unit length sustainable by each of the inner wall 210 and outer layer 250, as compared to the load per unit length required to produce a 5% deflection in the pipe. FIG. 5 depicts the predicted load per length necessary to produce a 5% deflection (solid lines) and the buckling load of the inner wall 210 (dashed lines).

The results indicate that increasing the thickness of the outer layer 250 may substantially increase both the load at 5% deflection and the buckling load of the inner wall 210. However, a thickness of the outer layer 250 of less than 0.15" may result in a buckling load for the inner wall 210, which is less than that required for a 5% deflection of the pipe.

The second study examined the effect of changing the thickness of the corrugated outer wall 220 (i.e., 0.18", 0.20", 0.22", 0.237", and 0.260") for the four different outer layer corrugation heights (i.e., 0", 0.125", 0.25", and 0.375"), given a thickness of the inner wall 210 of approximately 0.116" and a thickness of the outer layer 250 of approximately 0.16". The twenty different cases are represented in the table below:

| Case Number | Outer Layer 250 Corrugation Height (inches) | Outer Wall 220 Thickness (inches) |
|---|---|---|
| 1 | 0 | 0.180 |
| 2 | 0 | 0.200 |
| 3 | 0 | 0.220 |
| 4 | 0 | 0.237 |
| 5 | 0 | 0.260 |
| 6 | 0.125 | 0.180 |
| 7 | 0.125 | 0.200 |
| 8 | 0.125 | 0.220 |
| 9 | 0.125 | 0.237 |
| 10 | 0.125 | 0.260 |
| 11 | 0.25 | 0.180 |
| 12 | 0.25 | 0.200 |
| 13 | 0.25 | 0.220 |
| 14 | 0.25 | 0.237 |
| 15 | 0.25 | 0.260 |
| 16 | 0.375 | 0.180 |
| 17 | 0.375 | 0.200 |
| 18 | 0.375 | 0.220 |
| 19 | 0.375 | 0.237 |
| 20 | 0.375 | 0.260 |

Figure 6:
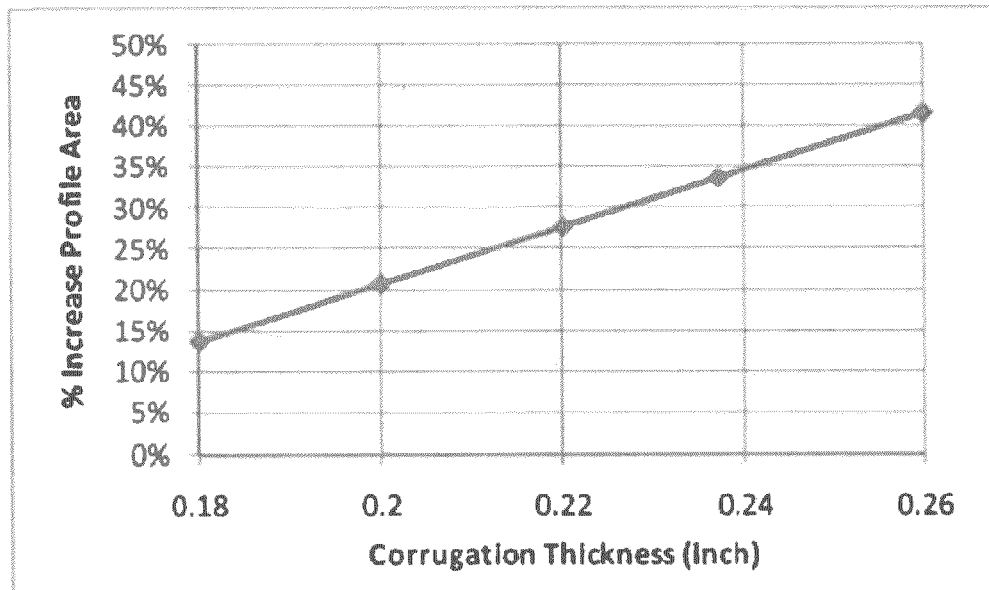
FIG. 6 illustrates a chart comparing a corrugated outer wall thickness of a pipe to a percent increase in pipe profile area.

The addition of the 0.16" outer layer 250 and changes to the thickness of the outer wall 220 resulted in a percent increase in pipe profile area, compared to a standard N-12 profile, as shown in FIG. 6.

Figure 7:
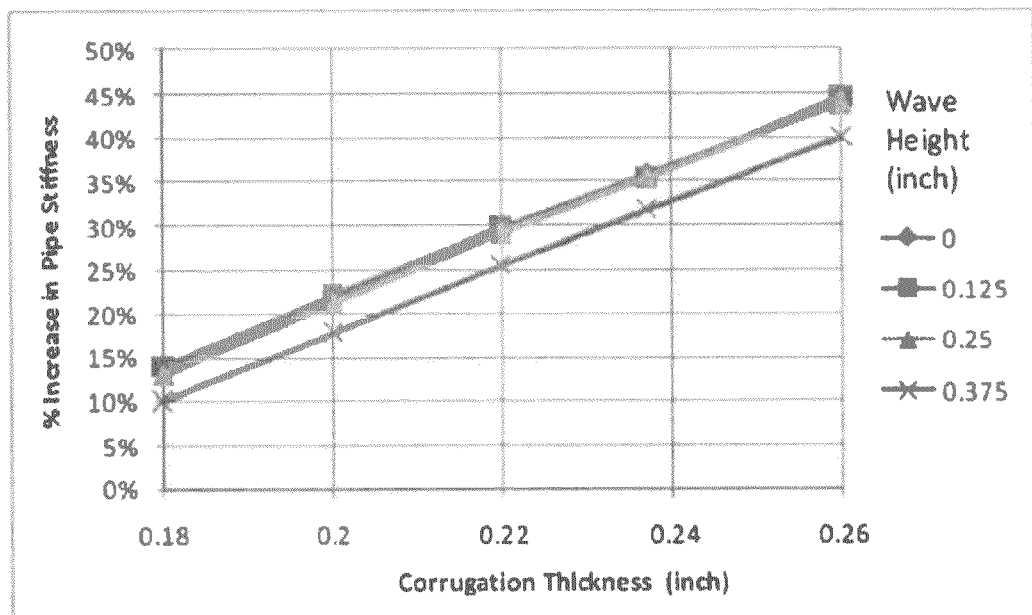
FIG. 7 illustrates a chart comparing a corrugated outer wall thickness of a pipe to a percent increase in pipe stiffness.

Finite element analyses were conducted for the twenty cases to determine the percent increase in pipe stiffness for each thickness of the corrugated outer wall 220 including the additional 0.16" outer layer 250, compared to a standard N-12, 48-inch pipe, as shown in FIG. 7.

The results indicate that increasing the thickness of the corrugated outer wall 220 increases the overall pipe stiffness. It was determined that reducing the thickness of the corrugated outer wall 220 from the standard N-12 thickness of 0.237" to 0.220" would reduce the pipe profile area by approximately 6.0% and reduce the pipe stiffness by approximately 6.3%. Moreover, only an outer layer 250 corrugation height ("wave height") approaching 0.375" would cause any substantial reduction in pipe stiffness.

Figure 8:
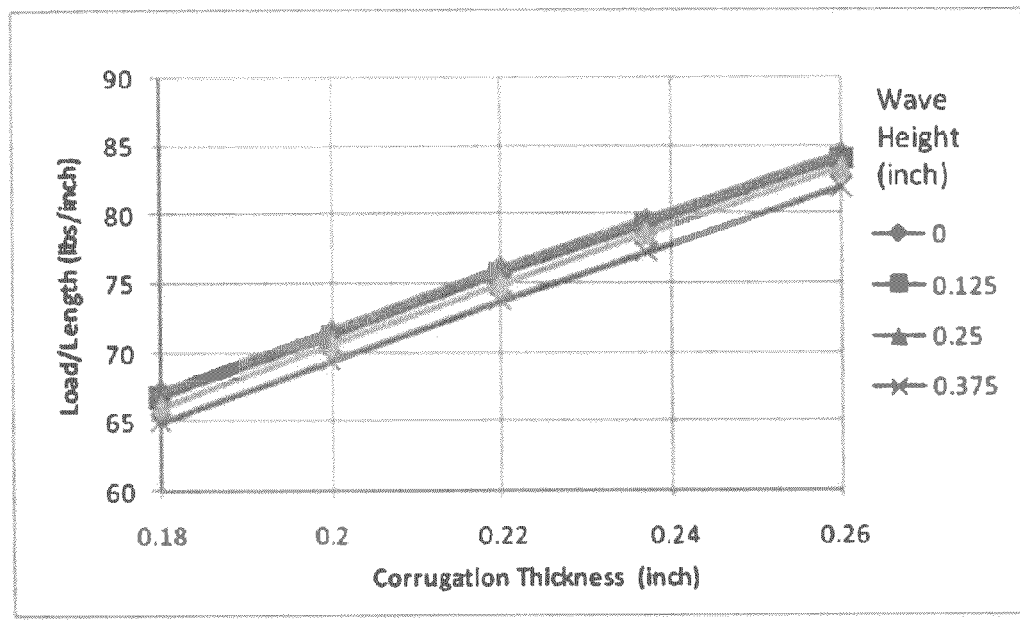
FIG. 8 illustrates a chart comparing a corrugated outer wall thickness of a pipe to a load per length.

Linear buckling analyses were conducted on the twenty profiles to determine the load per unit length sustainable by the inner wall 210 for each thickness of the corrugated outer wall 220 at a given outer layer 250 corrugation height ("wave height"), as shown in FIG. 8.

It was determined that reducing the thickness of the corrugated outer wall 220 from the standard N-12 thickness of 0.237" to 0.220" would reduce the buckling load of the inner wall 210 by about 4.5%.

Figure 9:
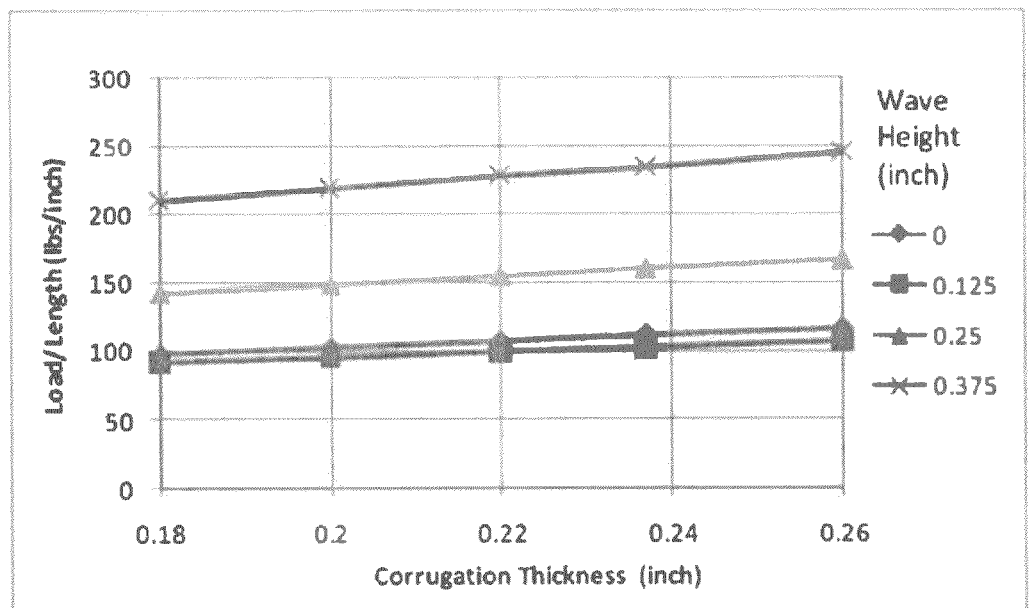
FIG. 9 illustrates another chart comparing a corrugated outer wall thickness of a pipe to a load per length.

Linear buckling analyses were also conducted on the twenty profiles to determine the load per unit length sustainable by the outer layer 250 for each thickness of the corrugated outer wall 220 at a given outer layer 250 corrugation height ("wave height"), as shown in FIG. 9.

It was determined that reducing the thickness of the corrugated outer wall 220 from the standard N-12 thickness of 0.237" to 0.220" would reduce the buckling load of the outer layer 250 by about 3.5%.

Figure 10:
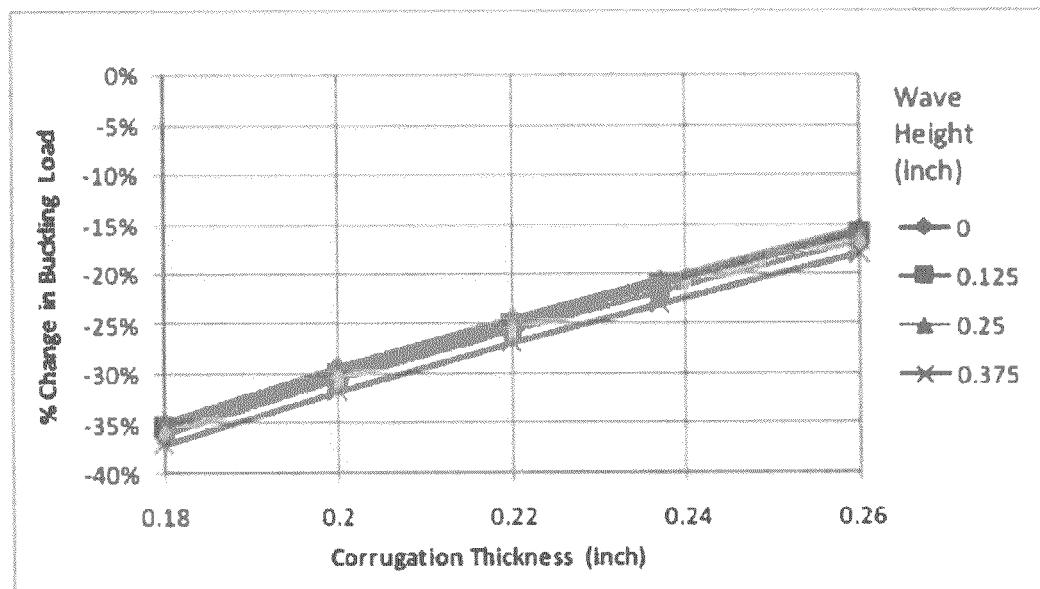
FIG. 10 illustrates a chart comparing a corrugated outer wall thickness of a pipe to a percent change in buckling load.

The buckling load of the corrugated, outer wall 220 of the three-wall pipe was also compared to the buckling load for corrugated wall of the standard N-12 profile, as depicted as a negative percent change in FIG. 10.

The results indicate that, over the profile dimensions considered, adding the outer layer 250 decreases the load at which buckling occurs in the corrugated wall. It was determined that reducing the thickness of the corrugated outer wall 220 from the standard N-12 thickness of 0.237" to 0.220" would reduce the buckling load of the outer wall 220 by about 4.5%.

Based on the results of these and other studies, it was determined that in an exemplary embodiment of the three-wall corrugated pipe, it would be advantageous to have the outer layer 250 and the inner wall 210 buckling at loads greater than the loads required for 5% pipe deflection. Accordingly, the outer layer 250 may have a thickness of approximately 0.15" or greater. For example, a thickness of 0.20" for the outer layer 250 may result in a 40% increase in stiffness. The inner wall 210 may have a thickness of approximately 0.15" or greater, considering that an increase in thickness from 0.116" to 0.15" results in an additional 40 lb/in in buckling load per unit length.

Moreover, the studies indicated that in an exemplary embodiment of the three-wall corrugated pipe, it would be advantageous to have an outer layer 250 corrugation height ("wave height") between approximately 0.15 and 0.25 inches. Specifically, it was found that an increase in outer layer corrugation height from 0.0 to 0.25 inches provided a 40% increase in buckling load for the outer layer 250, while producing only a modest 3% decrease in stiffness.

Accordingly, it was determined that the thicknesses of the outer wall 220 and the outer layer 250 could be adjusted in order to keep the overall pipe profile area relatively low, while providing increased stiffness and tolerable buckling loads. In particular, the corrugated pipe disclosed herein achieves reduced failure and installation sensitivity due to an increased moment of inertia (i.e., stiffness) of the pipe wall, which translates into increased resistance to deformation bending.

The outer layer 250 may decrease the amount of pipe wall deformation and improve pipe performance by increasing the pipe stiffness without thickening the pipe walls or using a stiffer material for the pipe walls. One way the outer layer 250 may accomplish this is by moving the centroid (or radius of gyration) of the pipe wall 200 closer to the midpoint of the wall thickness.

Figure 11:
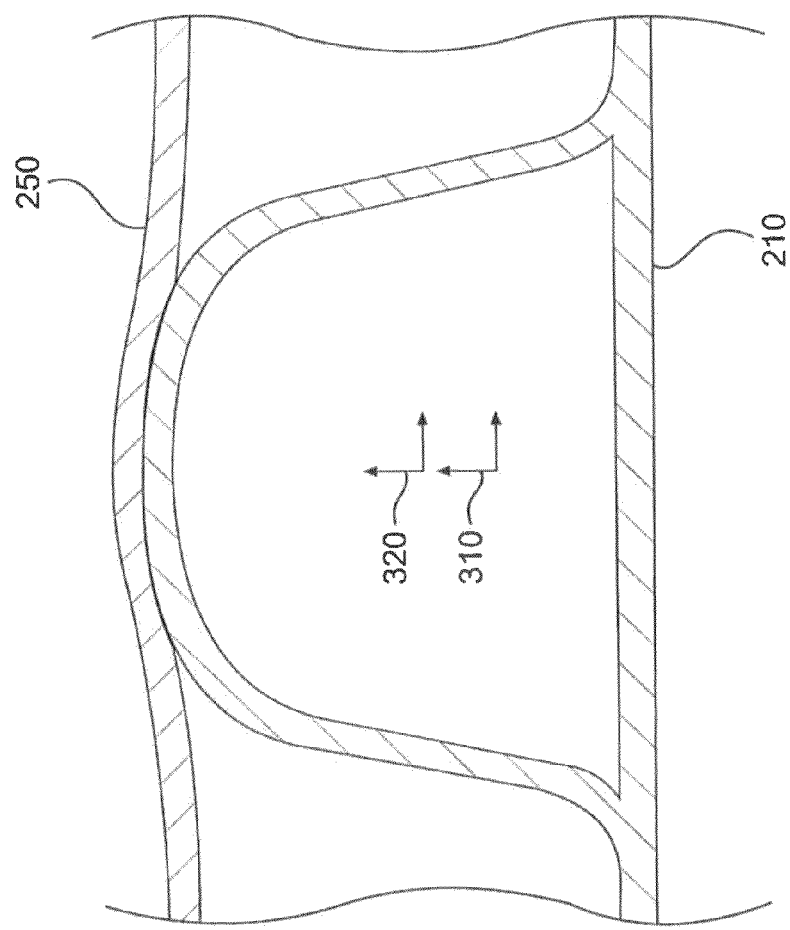
FIG. 11 illustrates a partial cross-section of the sidewall of FIG. 2, depicting the location of the centroid before and after addition of the outer layer.

FIG. 11 illustrates a portion of the pipe wall having a calculated location for the centroid 310 of a dual-wall pipe having no outer layer 250. The calculated location of the centroid 320 of a three-wall pipe having the outer layer 250 is also shown. As depicted, the mass of the outer layer 250 may move the centroid of the pipe wall closer to the midpoint of the wall thickness, thereby providing a more uniform stress distribution resulting in a lower maximum stress during any deformation bending.

In one embodiment, the thicknesses of each of the outer layer 250 and the inner wall 210 may be adjusted by a similar amount in order to maintain the location of the centroid 320 relative to the midpoint of the three wall pipe thickness. For example, given a need to increase the thickness of the outer layer 250, the thickness of the inner wall 210 may be increased by the same amount to prevent the centroid of the three wall pipe from moving. The thickness of the outer wall 220 may also be adjusted in a manner that maintains the desired location of the centroid. By preventing the centroid from moving, the optimal stiffness of the three-wall pipe can be maintained.

Moreover, just as the corrugations of known corrugated pipe may comprise a sacrificial layer capable of deflecting to a certain extent in order to accommodate forces exhibited on the pipe in use, the outer layer 250 of the present invention may provide yet another sacrificial layer. Thus, in an exemplary embodiment, there may be two layers capable of deflecting to accommodate forces exhibited on the pipe in use to prevent those forces from deforming the inner wall of the pipe.

The shape of the outer layer 250 may also advantageously increase the soil bearing area of the pipe exterior, because the load on the pipe created by backfill is spread out over a greater exterior area of the pipe, thus reducing the load per square inch on the pipe exterior thereby reducing the maximum forces on the pipe from the backfill load.

A further advantage of the presently disclosed three wall pipe is that the outer layer can be applied to or extruded with existing double wall corrugated pipe eliminating any need to redesign existing double wall corrugated pipe. The outer layer 250 may be fused to the corrugated outer wall 220 where the convex portions 260 of the outer layer 250 meet the crests 230 of the corrugated outer wall 220. The inner and outer walls 210, 220 may also be fused together by extruding the outer wall 220 onto the inner wall 210 while the inner wall 210 is still hot. Likewise, the outer layer 250 may be fused to the outer wall 220 by extruding the outer layer 250 onto the outer wall 220 while the outer wall 220 is still hot.

In a preferred embodiment, the manufacture of the three wall pipe includes extruding the outer layer 250 out of a cross-head die and onto the outside of the outer wall 220 while the outer layer 250 is still hot. The three wall pipe may then be conveyed through a spray tank to water-cool the three wall pipe without being first conveyed through a vacuum sizing tank. Accordingly, the naturally occurring concave portions 270 of the outer layer 250 are allowed to form between crests 230 of the corrugated outer wall 220, without the time and energy consuming process of vacuum sizing.

The layers of pipe may alternatively be co-extruded or adhered to each other with a suitable adhesive after extrusion. The present disclosure also contemplates a variety of methods for creating a pipe with an outer layer 250, for example by strapping the outer layer 250 to the outer wall 220 of the corrugated pipe.

In a preferred embodiment of the invention, the inner wall 210, outer wall 220, and outer layer 250 of the pipe comprise a plastic such as high density polyethylene (HDPE) or polypropylene (PP). The pipe may alternatively comprise a variety of other materials including, for example, other plastics, metals, or composite materials. For example, the inner wall 210, outer wall 220, and outer layer 250 of the pipe could be comprised of different, but compatible, materials.

Figure 12:
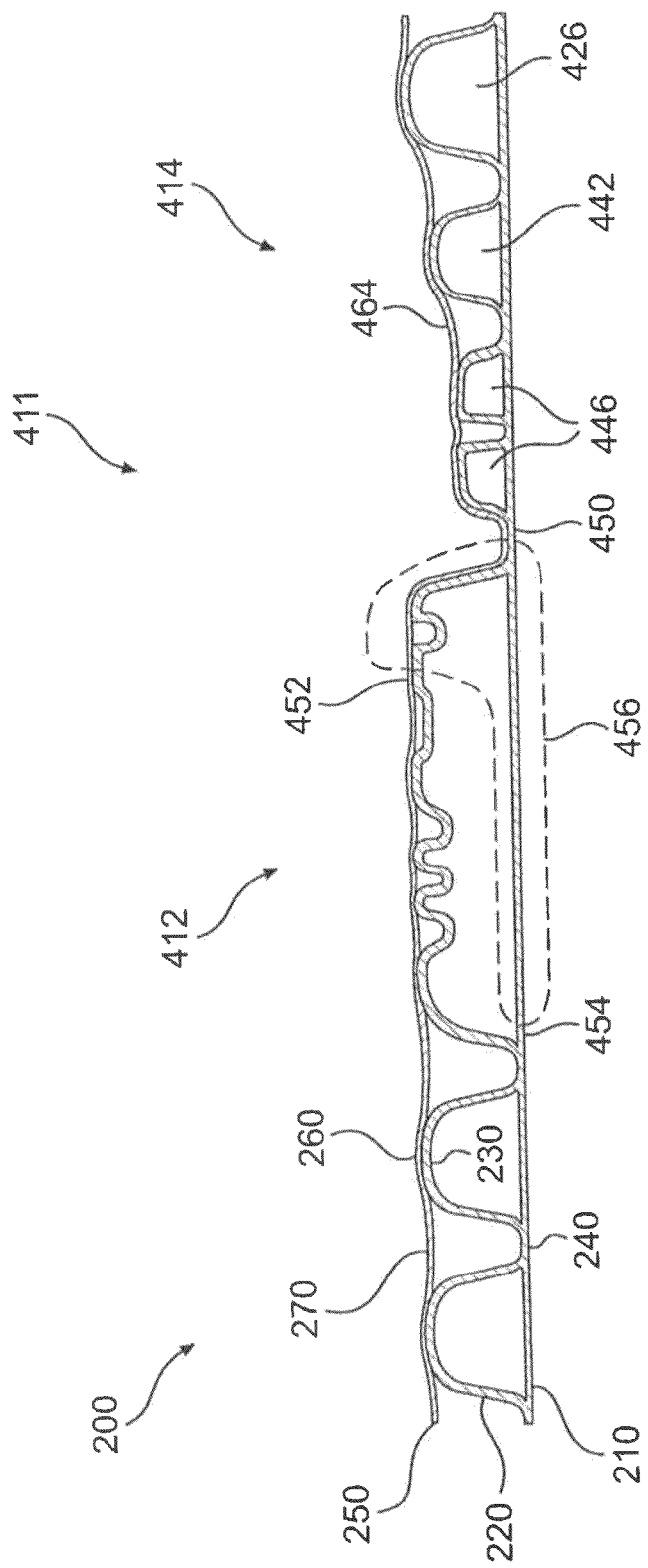
FIG. 12 illustrates a cross-section of the three-wall, corrugated pipe including an in-line bell and spigot formed therein.

Referring now to FIG. 12, it is also contemplated within the present disclosure to manufacture the pipe wall 200 having an in-line bell and spigot coupling formed therein. FIG. 12 illustrates an exemplary, partial portion of three-wall, corrugated pipe during manufacturing of a coupling preform 411 prior to cutting of the pipe. Specifically, a coupling preform 411, including a bell portion 412 and a spigot portion 414, may be formed "in-line" with the rest of the three-wall corrugated pipe. Accordingly, FIG. 12 illustrates a coupling preform 411, having the bell portion 412 and spigot portion 414 of three-wall, corrugated pipe, after having been extruded from a cross-head die but before having been cut into separate portions. As illustrated in FIG. 12, a portion of the outer layer 250 constituting a spigot outer wall 464 has been drawn down over, and fused or covalently bonded to, an intermediate corrugation 442 and spigot corrugations 446. Moreover, the spigot outer wall 464 may be drawn down adjacent to a spigot terminus 450, such that all three walls of the corrugated pipe are in contact between the spigot portion 414 and the bell portion 412 of the coupling preform 411. Because the walls have been drawn down together, a scrap portion 456 of the coupling preform 411 (indicated by dashed lines on FIG. 12) may be easily removed by making cuts proximate to the spigot terminus 450, a bell terminus 452, and an inner wall terminus 454.

Accordingly, the exemplary three-wall pipe having the inner wall 210, the corrugated outer wall 220 (having crests 230 and valleys 240), and the outer layer 250 (having convex portions 260 and concave portions 270), may be cut into discrete sections and coupled together by the bell and spigot portions 412, 414.

It will be apparent to those skilled in the art that various modifications and variations can be made in the gasket of the present invention and in construction of this gasket without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A pipe having an axially extending bore defined by a smooth inner wall fused to a corrugated outer wall having axially adjacent, annular, outwardly-extending crests separated by valleys; wherein the pipe further includes an outer layer fused to the outer wall, the outer layer having adjacent concave portions and convex portions, the concave portions being aligned with corrugation valleys of the outer wall so that each concave portion of the outer layer extends between at least two corrugation crests;

wherein a radial distance between a peak of a convex portion of the outer layer and a valley of a concave portion of the outer layer is approximately 0.25 inches, wherein the inner wall and the outer layer each has a thickness of at least approximately 0.15 inches.

2. The pipe of claim 1, wherein the inner wall, outer wall, and outer layer comprise plastic.

3. The pipe of claim 2, wherein the inner wall, outer wall, and outer layer comprise high density polyethylene.

4. The pipe of claim 2, wherein the inner wall, outer wall, and outer layer comprise polypropylene.

5. The pipe of claim 1, wherein the inner wall and the outer wall are co-extruded.

6. The pipe of claim 5, wherein the outer layer is fused to the outer wall by extruding the outer layer onto the outer wall while the outer wall is still hot.

7. The pipe of claim 1, wherein the outer wall has a thickness of approximately 0.220 inches.

8. The pipe of claim 1, wherein the outer wall has a thickness of approximately 0.220 inches.

9. A pipe having an axially extending bore defined by a smooth inner wall fused to a corrugated outer wall having axially adjacent, annular, outwardly-extending crests separated by valleys; wherein the pipe further includes an outer layer fused to the outer wall, the outer layer having adjacent concave portions and convex portions, the concave portions being aligned with corrugation valleys of the outer wall so that each concave portion of the outer layer extends between at least two corrugation crests;

wherein the outer layer has a thickness of approximately 0.20 inches, and the inner wall has a thickness of approximately 0.15 inches.

10. A pipe having an axially extending bore defined by a smooth inner wall fused to a corrugated outer wall having axially adjacent, annular, outwardly-extending crests separated by valleys; wherein the pipe further includes an outer layer fused to the outer wall, the outer layer having adjacent concave portions and convex portions, the concave portions being aligned with corrugation valleys of the outer wall so that each concave portion of the outer layer extends between at least two corrugation crests;

wherein a radial distance between a peak of a convex portion of the outer layer and a valley of a concave portion of the outer layer is approximately 0.25 inches, wherein the outer wall has a thickness of approximately 0.220 inches.

* * * * *